US010358144B2

(12) United States Patent
Kitagishi

(10) Patent No.: US 10,358,144 B2
(45) Date of Patent: Jul. 23, 2019

(54) NOTIFICATION-NEEDED INFORMATION PRESENTING APPARATUS, NOTIFICATION-NEEDED INFORMATION PRESENTING METHOD, AND NON-TRANSITORY COMPUTER READABLE STORAGE MEDIUM

(71) Applicant: YAHOO JAPAN CORPORATION, Tokyo (JP)

(72) Inventor: Ikuo Kitagishi, Tokyo (JP)

(73) Assignee: YAHOO JAPAN CORPORATION, Tokyo (JP)

(*) Notice: Subject to any disclaimer, the term of this patent is extended or adjusted under 35 U.S.C. 154(b) by 0 days.

(21) Appl. No.: 15/655,181

(22) Filed: Jul. 20, 2017

(65) Prior Publication Data

US 2017/0318433 A1  Nov. 2, 2017

Related U.S. Application Data

(63) Continuation of application No. 15/194,071, filed on Jun. 27, 2016.

(30) Foreign Application Priority Data

Sep. 3, 2015 (JP) .................. 2015-174216
Sep. 3, 2015 (JP) .................. 2015-174218

(51) Int. Cl.
*B60W 50/14* (2012.01)
*H04B 1/3822* (2015.01)
(Continued)

(52) U.S. Cl.
CPC .......... *B60W 50/14* (2013.01); *H04B 1/3822* (2013.01); *H04L 41/22* (2013.01); *H04W 4/029* (2018.02);
(Continued)

(58) Field of Classification Search
CPC ......................................... B60W 50/14–50/16
See application file for complete search history.

(56) References Cited

U.S. PATENT DOCUMENTS 6,526,335 B1   2/2003  Treyz et al.
8,823,507 B1 * 9/2014  Touloumtzis ........... H04L 67/24
                                                            340/501
(Continued)

FOREIGN PATENT DOCUMENTS

JP  2004-240506 A   8/2004
JP  2005-193874 A   7/2005
(Continued)

OTHER PUBLICATIONS

Oct. 23, 2017 Office Action issued in U.S. Appl. No. 15/194,071.
(Continued)

*Primary Examiner* — Gennadiy Tsvey
(74) *Attorney, Agent, or Firm* — Oliff PLC

(57) ABSTRACT

A notification-needed information presenting apparatus that includes a plurality of display devices configured to display information to an occupant of a vehicle, at least one sensor included in each of the plurality of display devices that is configured to detect at least one of a position of the occupant and a behavior of the occupant, and a processor operatively coupled with the plurality of display devices and each of the at least one sensor that is programmed to determine behavior of the occupant toward the plurality of display devices, and control the plurality of display devices to present an advertisement to the occupant in accordance with at least one of: the determined behavior of the occupant, and a condition related to the vehicle.

10 Claims, 14 Drawing Sheets

(51) Int. Cl.
*H04W 4/20* (2018.01)
*H04L 12/24* (2006.01)
*H04W 4/029* (2018.01)

(52) U.S. Cl.
CPC ........ *H04W 4/20* (2013.01); *B60W 2050/146* (2013.01)

(56) References Cited

U.S. PATENT DOCUMENTS

| | | | |
|---|---|---|---|
| 9,075,435 B1* | 7/2015 | Noble | G06F 3/013 |
| 9,381,848 B2* | 7/2016 | Mori | B60Q 1/00 |
| 9,457,914 B1 | 10/2016 | Cline et al. | |
| 2005/0270152 A1* | 12/2005 | Harumoto | B60R 25/102 |
| | | | 340/539.16 |
| 2006/0235615 A1 | 10/2006 | Kato et al. | |
| 2007/0050248 A1 | 3/2007 | Huang et al. | |
| 2007/0069872 A1* | 3/2007 | Arakawa | B60Q 9/008 |
| | | | 340/435 |
| 2010/0079270 A1 | 4/2010 | Krautter et al. | |
| 2013/0093579 A1* | 4/2013 | Arnon | B60Q 1/2665 |
| | | | 340/425.5 |
| 2013/0145297 A1 | 6/2013 | Ricci et al. | |
| 2014/0095294 A1 | 4/2014 | Vick et al. | |
| 2015/0094899 A1 | 4/2015 | Hackenberg et al. | |
| 2015/0161551 A1* | 6/2015 | Warren | G06Q 10/06395 |
| | | | 705/7.41 |
| 2015/0256276 A1 | 9/2015 | Jones | |
| 2015/0347075 A1* | 12/2015 | Levesque | G06F 3/1423 |
| | | | 345/3.1 |
| 2016/0267335 A1* | 9/2016 | Hampiholi | G06F 3/013 |
| 2017/0084176 A1* | 3/2017 | Nakamura | G06T 7/70 |
| 2018/0032997 A1* | 2/2018 | Gordon | G06Q 20/3224 |

FOREIGN PATENT DOCUMENTS

| | | | |
|---|---|---|---|
| JP | 2005-275131 A | | 10/2005 |
| JP | 2007-145310 A | | 6/2007 |
| JP | 2007249567 A | * | 9/2007 |
| JP | 2008-097351 A | | 4/2008 |
| JP | 2010-002759 A | | 1/2010 |
| JP | 2010002759 A | * | 1/2010 |
| JP | 4735310 B2 | | 7/2011 |
| JP | 2012-147050 A | | 8/2012 |
| JP | 2013-041444 A | | 2/2013 |
| JP | 2013-045169 A | | 3/2013 |
| JP | 2013-073290 A | | 4/2013 |
| JP | 2014-016654 A | | 1/2014 |
| JP | 2014-098769 A | | 5/2014 |
| JP | 2014-197252 A | | 10/2014 |
| JP | 2015-034767 A | | 2/2015 |
| JP | 2015-069338 A | | 4/2015 |
| WO | 2015/122406 A1 | | 8/2015 |

OTHER PUBLICATIONS

Dec. 22, 2016 Office Action issued in Japanese Patent Application No. 2015-174216.
Jan. 11, 2017 Office Action issued in Japanese Patent Application No. 2015-174218.
Feb. 27, 2017 Office Action Issued in U.S. Appl. No. 15/194,071.
Apr. 3, 2017 Office Action issued in Japanese Patent Application No. 2015-174218.
Jun. 29, 2017 Office Action issued in U.S. Appl. No. 15/194,071.
Jun. 29, 2017 Office Action issued in Japanese Patent Application No. 2017-025871.
Nov. 28, 2017 Office Action issued in Japanese Patent Application No. 2017-025871.
Sep. 6, 2018 Office Action issued in Japanese Patent Application No. 2015-174218.
Feb. 28, 2019 Office Action issued in Japanese Patent Application No. 2017-161443.

* cited by examiner

FIG.3

| No. | DATE AND HOUR OF ACQUISITION | CATEGORY | CONTENT |
|---|---|---|---|
| 001 | 02.01.12:34 | SURROUNDING ENVIRONMENT | SNOWFALL |
| 002 | 02.01.12:38 | SURROUNDING ENVIRONMENT | TRAFFIC JAM AHEAD IN ROUTE |
| 003 | 02.01.14:54 | VEHICLE | LOW REMAINING FUEL |
| 004 | 02.02.09:34 | VEHICLE | FLAT TIRE AT RIGHT REAR WHEEL |
| 005 | 02.08.07:37 | SURROUNDING ENVIRONMENT | OBSTACLE APPROACHING |
| 006 | 02.08.07:39 | VEHICLE | SUSPECTED FAILURE OF AIR CONDITIONER |
| 007 | 02.10.11:12 | VEHICLE | UNAVOIDABLE COLLISION |
| ⋮ | ⋮ | ⋮ | ⋮ |

FIG.4

| OCCUPANT | POSITION | INFORMATION PRESENTING UNIT | POSITIONAL RELATION | PRESENTED CONTENT |
|---|---|---|---|---|
| 001 | RIGHT FRONT SEAT | DISPLAY FOR DRIVING | NEAR, FACING THE BACK | INFORMATION FOR DRIVING |
| | | DISPLAY FOR NAVIGATION | NEAR, FACING THE SIDE | MAP (NO ASSISTANCE) |
| | | CARRIED-IN TABLET TERMINAL | FAR, FACING THE SIDE | NONE |
| | | CARRIED-IN MOBILE TERMINAL | NEAR, HELD IN HAND(S) | GAME |

FIG.5

| INFORMATION PRESENTING UNIT | MANNER OF PRESENTATION |
|---|---|
| DISPLAY FOR DRIVING | DISPLAY ALONG WITH INFORMATION FOR DRIVING, OUTPUT ALERTING SOUND |
| DISPLAY FOR NAVIGATION | DISPLAY IN PLACE OF MAP |
| CARRIED-IN TABLET TERMINAL | NO PRESENTATION |
| CARRIED-IN MOBILE TERMINAL | DISPLAY IN PLACE OF GAME SCREEN, OUTPUT ALERTING SOUND, VIBRATE TERMINAL |

FIG.10

| No. | DATE AND HOUR OF ACQUISITION | CATEGORY | CONTENT | NOTIFICATION LEVEL |
|---|---|---|---|---|
| 001 | 02.01.12:34 | SURROUNDING ENVIRONMENT | SNOWFALL | 6 |
| 002 | 02.01.12:38 | SURROUNDING ENVIRONMENT | TRAFFIC JAM AHEAD IN ROUTE | 3 |
| 003 | 02.01.14:54 | VEHICLE | LOW REMAINING FUEL | 7 |
| 004 | 02.02.09:34 | VEHICLE | FLAT TIRE AT RIGHT REAR WHEEL | 9 |
| 005 | 02.08.07:37 | SURROUNDING ENVIRONMENT | OBSTACLE APPROACHING | 8 |
| 006 | 02.08.07:39 | VEHICLE | SUSPECTED FAILURE OF AIR CONDITIONER | 4 |
| 007 | 02.10.11:12 | VEHICLE | UNAVOIDABLE COLLISION | 10 |
| ⋮ | ⋮ | ⋮ | ⋮ | ⋮ |

FIG.13
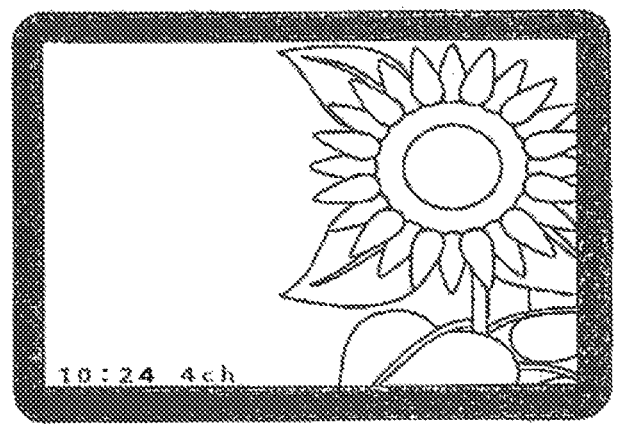
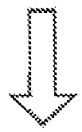
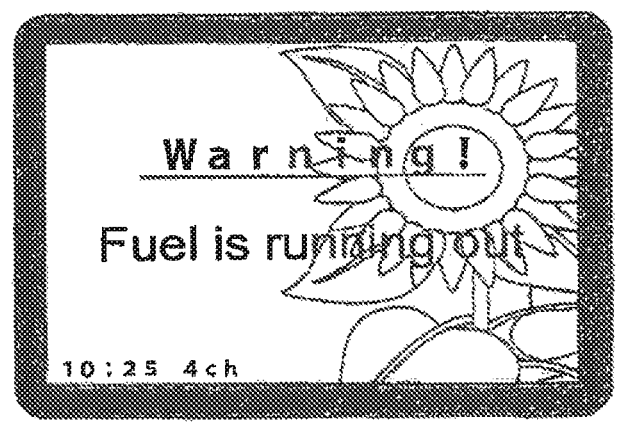

FIG.14
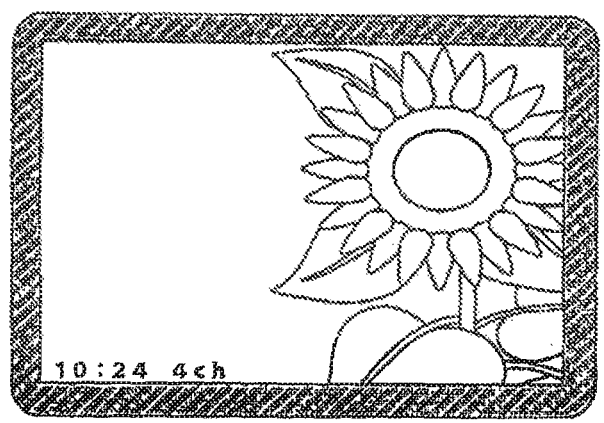
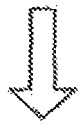
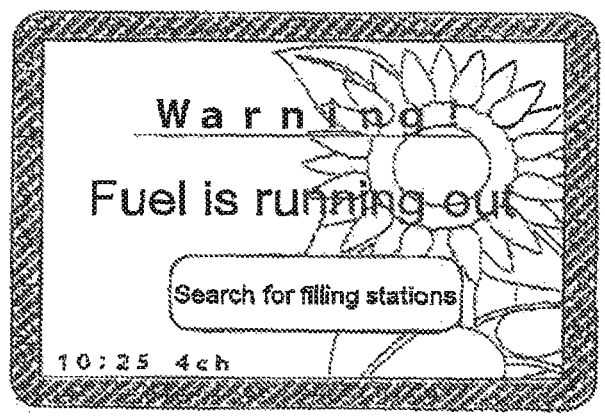

NOTIFICATION-NEEDED INFORMATION PRESENTING APPARATUS, NOTIFICATION-NEEDED INFORMATION PRESENTING METHOD, AND NON-TRANSITORY COMPUTER READABLE STORAGE MEDIUM

CROSS-REFERENCE TO RELATED APPLICATION(S)

This is a Continuation of U.S. application Ser. No. 15/194,071, filed Jun. 27 2016, which claims priority to and incorporates by reference the entire contents of Japanese Patent Application No. 2015-174216 filed in Japan on Sep. 3, 2015 and Japanese Patent Application No. 2015-174218 filed in Japan on Sep. 3, 2015.

BACKGROUND OF THE INVENTION

1. Field of the Invention

The present invention relates to a technique for presenting information that an occupant of a vehicle needs to be notified of to the occupant in accordance with the behavior of the occupant and with situations related to operation of the vehicle.

2. Description of the Related Art

In recent years, the development of techniques for automated driving has been pushed forward. In relation to automated driving, conventional techniques for notifying an occupant of a danger while a vehicle is traveling include a proposed technique that enables danger levels of dangers that the occupant is notified of to be changed depending on whether the vehicle is under fully automated driving or human-operated driving (for example, Japanese Patent No. 4735310).

In this connection, the current situation is as follows: information for driving (such as a vehicle speed, a remaining fuel quantity, a map, and navigational assistance on the direction of travel) is displayed on a display unit for driving (such as, for example, a dashboard or a display screen in front of a driver, or a screen for navigation); and displaying other contents (such as a television program) on a display unit for driving and the driver's using information devices and screens other than a display unit for driving are prohibited.

However, in the future, with the advent of fully reliable automated driving, it will be a common practice for drivers to take their eyes off the outside of the vehicle and the dashboard or a display screen in the vehicle. As a consequence, there will possibly be situations where contents are displayed on a display screen installed in an automated driving vehicle, where contents are displayed on an information device (such as a smartphone or a tablet personal computer (PC) carried into the vehicle by an occupant) other than that installed in an automated driving vehicle, and where an occupant is focusing his or her attention exclusively on such contents.

In this case, if danger notification is given only in an audio form or only through a display apparatus of an automated driving apparatus, it means that the notification is communicated through a different route than the information device that the occupant faces. Resulting inconveniences would include that the communication does not appropriately reach the occupant, that the occupant is unable to make a quick decision on which route to be used for an immediate operation responding to the communication, and that a response time lag occurs, for example, because the occupant has to change his/her orientation so as to face the display unit for driving. For this reason, there is a potential need for control that is performed when danger notification is given to a display apparatus basically intended for content utilization and to an information device other than a device installed in a vehicle.

SUMMARY OF THE INVENTION

It is an object of the present invention to at least partially solve the problems in the conventional technology.
A notification-needed information presenting apparatus The notification-needed information presenting apparatus according to the present application includes at least one information presenting unit capable of presenting information to an occupant of a vehicle, a notification-needed information acquiring unit that acquires notification-needed information, which is information that the occupant needs to be notified of through the information presenting unit in relation to operation of the vehicle, an occupant behavior determining unit that determines behavior of the occupant toward the information presenting unit, and a presentation controlling unit that controls the information presenting unit to present the notification-needed information to the occupant in accordance with the behavior of the occupant determined by the occupant behavior determining unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a conceptual diagram illustrating an example of notification-needed information;

FIG. 4 is a diagram illustrating an example of the behavior of an occupant;

FIG. 5 is a diagram illustrating an example of control performed on individual information presenting units in accordance with the behavior of the occupant in the example of FIG. 4;

FIG. 10 is a diagram illustrating an example of notification-needed information with which notification levels are assigned;

FIG. 13 is a conceptual diagram illustrating an example of highlighting notification-needed information against other information;

FIG. 14 is a conceptual diagram depicting an example of a graphic user interface (GUI) part for receiving operational control.

DETAILED DESCRIPTION OF THE PREFERRED EMBODIMENTS

The following describes embodiments of the present invention with reference to the accompanying drawings. These embodiments are not intended to limit the present invention, and the present invention can be carried out in various aspects without departing from the scope thereof.

First Embodiment

Summary

Figure 1:
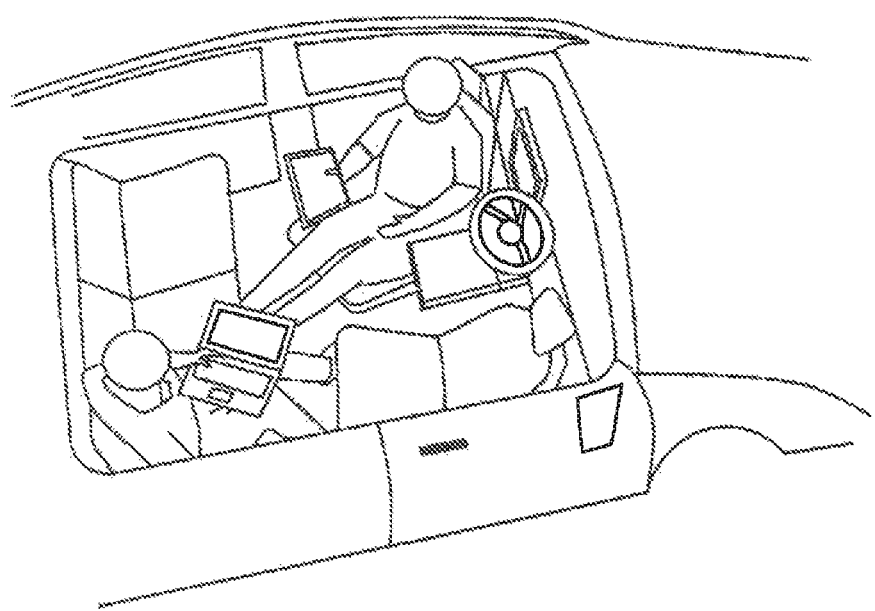
FIG. 1 is a conceptual diagram illustrating an example of an in-vehicle state of a vehicle capable of automated driving to which a notification-needed information presenting apparatus in one embodiment according to the present invention is applied.

FIG. 1 is a conceptual diagram illustrating an example of an in-vehicle state of a vehicle capable of automated driving to which a notification-needed information presenting apparatus in one embodiment of the present invention is applied. As illustrated, an occupant sitting in the front row is using a tablet PC in the hands of the occupant with his or her back facing the direction of travel. Another occupant sitting in the rear row is using a laptop PC. In this vehicle, a display apparatus for displaying information for driving and navigation information is installed in a dashboard.

In this situation, for example, when the remaining fuel quantity has decreased to the extent that fueling is needed, the need to notify the occupants thereof arises. When such notification is made through the display apparatus installed in the dashboard, it is doubtful that the notification appropriately reaches the occupant sitting with his or her back facing the display apparatus. Therefore, the present apparatus notifies the occupant sitting with his or her back toward the direction of travel, of the decrease in remaining fuel through the tablet PC that is being used by this occupant. Accurate notification about information that the occupant needs to be notified of is thus enabled.

Configuration

Figure 2:
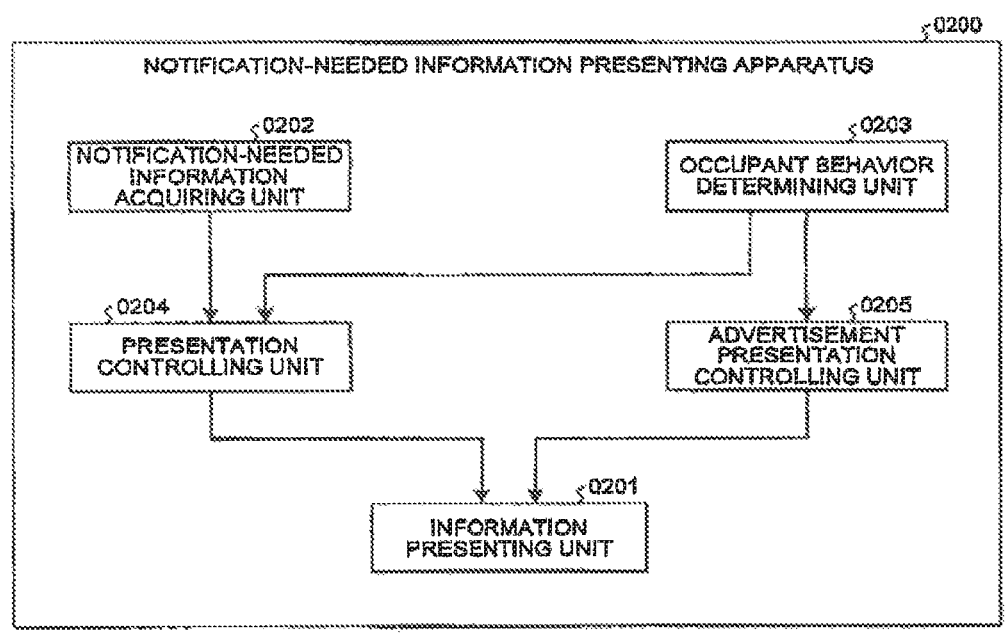
FIG. 2 is a block diagram illustrating an example of functional blocks of a notification-needed information presenting apparatus in a first embodiment.

FIG. 2 is a block diagram illustrating an example of functional blocks of a notification-needed information presenting apparatus in a first embodiment. Each of the functional blocks of the present apparatus described below is implemented as a combination of hardware and software. Specifically, in the case of using a computer, examples of components in the combination include: hardware component units such as a central processing unit (CPU), a main memory, a system bus, a secondary storage device (such as a hard disk drive, a non-volatile memory, or a combination of storage media (such as a compact disc (CD) and a digital versatile disc (DVD)) and a drive for reading the media), an input device that is utilized for inputting information, a display apparatus, and an external peripheral apparatus other than the foregoing apparatuses; an interface for the external peripheral apparatus; an interface for communication; driver programs for controlling such pieces of hardware; other application programs; and an application for a user interface.

In this case, the CPU performs arithmetic processing in accordance with a program loaded on the main memory, so that: data and the like that have been input from the input device and other devices such as an interface and been retained on a memory or a hard disk are processed and accumulated; and instructions for controlling the above respective pieces of hardware and software are generated. The functional block of the present apparatus may be implemented as dedicated hardware. The present apparatus is not limited to being configured in the form of a single piece of hardware or software, and may be configured in the form of a plurality of pieces of hardware and/or software or be configured so as to include a server apparatus across a network.

This invention not only can be implemented as an apparatus but also can be implemented as a method. Furthermore, a part of this invention can be configured as software. Obviously, the technical scope of this invention includes a computer program for use in causing a computer to execute the software, and a recording medium in which the computer program is retained (the same applies to all through the entirety of the present specification).

As illustrated in FIG. 2, a notification-needed information presenting apparatus 0200 in the first embodiment includes an information presenting unit 0201, a notification-needed information acquiring unit 0202, an occupant behavior determining unit 0203, a presentation controlling unit 0204, and an advertisement presentation controlling unit 0205. The advertisement presentation controlling unit 0205 is not an essential component that the notification-needed information presenting apparatus in the first embodiment needs to include.

The present apparatus is intended to present notification-needed information to an occupant of a vehicle capable of automated driving as described above but is not intended for a specific level of automated driving (any one of levels defined stepwise such as individual driving assistance, semi-automated driving, nearly automated driving, and fully automated driving), and effectively works also in an automobile that employs Advanced Driver Assistance System (ADAS). Examples of the vehicle include not only private vehicles but also commercial vehicles and vehicles for construction and other purposes, and include not only four-wheeled vehicles (including multiple-wheeled vehicles such as six-wheeled and eight-wheeled vehicles) but also three-wheeled vehicles and two-wheeled vehicles (including stand-and-ride type two-wheel vehicles), and may include boats, ships and airplanes.

The information presenting unit 0201 is capable of presenting information to an occupant of the vehicle. For example, a display that provides information related to traveling of the vehicle such as the vehicle speed and fuel, a touch screen that indicates the states of equipment such as audio equipment and air-conditioning equipment and are used for operating these pieces of equipment, or a navigation device corresponds to the information presenting unit 0201. A display (for example, a display for occupants in the rear seats) installed in the interior of the vehicle for displaying a video content or the like with no relation to operation of the vehicle also corresponds thereto.

An information processing apparatus such as a smartphone or a tablet PC that an occupant has carried into the vehicle also corresponds thereto. To present information means to provide some sort of information in a manner appealing to the sense of an occupant such as the sense of sight, the sense of hearing, or the sense of touch. For example, information is provided in a manner appealing to the sense of sight using a video, light or the like, appealing to the sense of hearing using sound or the like, or appealing to the sense of touch using vibration or the like. The information presenting units 0201 can be thus present as a plurality of separate units.

The notification-needed information acquiring unit 0202 acquires notification-needed information, which is information that the occupant needs to be notified of through the information presenting unit 0201 in relation to operation of the vehicle. Examples of the notification-needed information include information that the occupant needs to be notified of in relation to the vehicle itself, such as a low remaining fuel quantity, a reduction in pneumatic pressure of a tire, a tire having gone flat, failures (including potential failures) of the various pieces of equipment, and an unavoidable collision.

Examples thereof further include information that the occupant needs to be notified of in relation to the surrounding environment, such as a road being impassable or under a traffic restriction due to an accident or a disaster, a traffic jam, approach of an emergency vehicle or an obstacle, snowfall, and a frozen road surface. FIG. 3 is a conceptual diagram illustrating an example of the notification-needed information acquired. As illustrated, the category of information and the date and hour of acquisition, for example, may be acquired in addition to the content of the notification-needed information. Such information as the source of information, whether any occupant has responded to the notification, and whether second notification is needed may be additionally acquired and retained.

In acquisition of the notification-needed information, for example, the information on the vehicle itself can be acquired from various detection modules installed in the vehicle, and the information relating to the surrounding environment can be acquired through information reception from VICS (Vehicle Information and Communication System; registered trademark), by use of the Internet, and from equipment such as a radar, laser intensity direction and ranging (LIDAR), Global Positioning System (GPS), and a camera.

The occupant behavior determining unit 0203 determines the behavior of the occupant toward the information presenting units 0201. The behavior of an occupant toward the information presenting units 0201 can be variously defined. Examples of the behavior of an occupant toward each of the information presenting units 0201 installed in the vehicle that present information for navigation and information relating to the vehicle include the positional relation between the information presenting unit 0201 and the occupant, the physical posture of the occupant toward the information presenting unit 0201, and the content of information being presented by the information presenting unit 0201 to the occupant. The occupant behavior determining unit 0203 may determine, for example, the temperature of the occupant, whether the occupant is having a conversation with another occupant, the content of a conversation, whether the occupant is eating, and what kind of food or drink is being taken.

These specific details of the behavior of the occupant can be determined by having each of the information presenting units 0201 equipped with a human sensor and/or an eye tracking sensor, and/or equipped with a camera. Furthermore, the presence or absence of an occupant near the information presenting unit 0201 can be determined from whether the information presenting unit 0201 is being operated. The position of an occupant inside the vehicle can be determined by having a pressure sensor in each seat of the vehicle or capturing an image of the interior of the vehicle by an infrared camera.

Examples of the behavior of an occupant toward each of the information presenting units 0201 carried into the vehicle by the occupant, such as mobile terminals including a smartphone and a tablet PC, include whether the information presenting unit 0201 is being operated by the occupant and what content the information presenting unit 0201 is presenting. A further determination may be made as to toward which region within the entirety of a display the eyes of an occupant are directed.

These types of behavior of an occupant are determined in a manner including: detecting, with a vibration sensor and/or a human sensor installed in the information presenting unit 0201, the presence of an occupant having the information presenting unit 0201 in his or her hand or hands; and acquiring the operational state (such as displaying a video content, reproducing a music content, or using the Internet) of the information presenting unit 0201. In addition, the position of an occupant inside the vehicle may be detected, and the following may be determined: which one of the information presenting units 0201 the occupant is using; and where inside the vehicle and how the occupant is using the information presenting unit 0201.

Acquisition of information detected by the information presenting units 0201 and information indicating the operational states of the information presenting units 0201 can be carried out by an information processing apparatus (hereinafter also referred to as an in-vehicle information processing apparatus) installed in the vehicle for various kinds of processing such as acquisition, retention, and display of various kinds of information on the vehicle itself and for navigation. In addition, acquisition of various kinds of information from the information presenting units 0201 can be implemented with communication established between each of the information presenting units 0201 carried into the vehicle and the above information processing apparatus. The communication is implemented over near field communication, a wireless LAN, the Internet, or the like.

FIG. 4 is a diagram illustrating an example of the behavior of an occupant that has been determined by the occupant behavior determining unit 0203. The total number of information presenting units 0201 set in this example is four. "POSITION" indicates the position of an occupant 001, who is positioned in the right front seat in this example. "POSITIONAL RELATION" indicates, for example, the positional relations and the postures of the respective information presenting units 0201 with and toward the occupant 001. As illustrated, the occupant 001 is near a display for driving but with his or her back facing the display. At the same time, it is indicated that a mobile terminal is being held in the hand of the occupant. "PRESENTED CONTENT" indicates contents that the respective information presenting units 0201 are presenting.

Information for driving is being presented on the display for driving, and a map is being presented on a display for navigation without routing assistance provided. The mobile terminal is presenting a game.

As described above, the occupant behavior determining unit 0203 is also capable of specifying which one of the information presenting units 0201 the occupant is using, and can be described as including an information presenting unit specifying module as a module for achieving this function.

In accordance with the behavior of an occupant determined by the occupant behavior determining unit 0203, the presentation controlling unit 0204 controls the respective information presenting units 0201 to present notification-needed information to the occupant. FIG. 5 is a diagram illustrating an example of control performed on the individual information presenting units 0201 in accordance with the behavior of the occupant in the example of FIG. 4. For example, the display for driving is controlled to display thereon notification-needed information along with information for driving and to additionally output alerting sound. The display for navigation is controlled to display thereon the notification-needed information instead of displaying a map. The mobile terminal held in the hand of the occupant is controlled to display thereon notification-needed information in place of a game screen and to output alerting sound, and is further controlled to vibrate. At the same time, the tablet PC is not controlled to display thereon the notification-needed information.

Thus, the information presenting unit 0201 that is located near an occupant and that can be presumed as the one to which the occupant is paying attention is controlled to present notification-needed information, in priority to the other information presenting units 0201. In addition, the display for driving and the display for navigation on which an operation or the like can be considered likely to be performed in response to the presented notification-needed information are also controlled to present the notification-needed information. At the same time, the tablet terminal is controlled not to present the notification-needed information because it can be considered likely that the occupant is paying no attention to the tablet terminal, and because distributed presence of the information presenting units 0201 on which the notification-needed information is presented may possibly end up confusing the occupant and preventing the occupant from making an appropriate response. As described above, the controlling on presentation includes disabling presentation.

Optionally, after the notification-needed information is presented, a button for asking the occupant for confirmation of the presented information may be displayed, and processing for receiving a spoken reply may be performed. Further optionally, control may be performed so that presentation of the notification-needed information can be continued until after the occupant, for example, performs an operation for the confirmation, replies, or performs an operation for responding to the information that the occupant is notified of.

As described above, the presentation controlling unit 0204 is capable of controlling the information presenting unit 0201 specified as the one being used by an occupant to present notification-needed information, and can be described as including a specified-presentation controlling module as a module for achieving this function.

As described above, the behavior of an occupant toward the information presenting units 0201 is determined, and the information presenting units 0201 are controlled to present notification-needed information to the occupant in accordance with the determined behavior. This determining and controlling enables the occupant to be notified of information that the occupant needs to be notified of.

The advertisement presentation controlling unit 0205 controls the information presenting unit 0201 to present an advertisement in accordance with at least one of the behavior of an occupant determined by the occupant behavior determining unit 0203 and a condition related to the vehicle. It is considered that presentation of an advertisement to an occupant more effectively works if being performed in accordance with the behavior of the occupant, the state of traveling of a vehicle, the surrounding environment, and so on.

The behavior of an occupant is as described above. A wide variety of conditions, such as conditions related to the vehicle itself, conditions of the surroundings and the environment around the vehicle, and types of information being displayed by the information presenting units 0201 inside the vehicle, correspond to the "condition related to the vehicle". For example, various conditions such as the following correspond thereto: the vehicle inspection expiration date; the vehicle shape; the remaining fuel quantity; the level of automated driving; the weather; the climate; the traveling speed; the current location; whether the vehicle is on an ordinary road or on an express highway; traffic volumes in the surrounding areas; the statuses of automated driving of the surrounding vehicles (such as whether there are vehicles traveling in a platoon and the number of vehicles forming the platoon); the destination; and the traveling history.

Some of these various conditions have been retained in an information processing apparatus and an navigation device that are included in the vehicle; some are acquired by various sensors included in the vehicle; some are input through operations performed by an occupant; some are acquired through broadcasting or the Internet; and some are acquired from GPS. Handling such as acquisition and retention of these conditions is thus possible.

In one example of control by the advertisement presentation controlling unit 0205, a display for driving that is displaying thereon accumulated data on the fuel economy is controlled to present an advertisement of an automobile supply house to an occupant facing the display for driving. The navigation device is controlled to present an advertisement of a restaurant to an occupant searching for nearby restaurants on the navigation device. The tablet terminal is controlled to present an advertisement of a travel to an occupant browsing information on a tourist spot on the tablet terminal. When the vehicle has just crossed a border between prefectures, any one of the information presenting units 0201 is controlled to present an advertisement of a local special product of the prefecture newly entered by the vehicle. In addition, when the vehicle is traveling on a narrow road or a road crowded with pedestrians, the information presenting units 0201 are controlled not to present any advertisement. The controlling the information presenting unit 0201 includes disabling presentation of advertisements.

Furthermore, each of the information presenting units 0201 may be controlled to present an advertisement in a manner that suits the behavior of an occupant and/or a condition related to the vehicle. For example, the display for driving is controlled to present advertisements only by way of audio output to an occupant facing the display for driving. While the vehicle is traveling through a traffic jam and is on autopilot, the display for driving is controlled to present video advertisements containing sound for a relatively long period of time. While the vehicle is traveling on a winding mountainous road, the display for driving is controlled to present simple advertisements such as a combination of a still image and audio output of a trade name.

Furthermore, the advertisement presentation controlling unit 0205 may include an advertisement subordination controlling module configured to control the information presenting units 0201 so that presentation of advertisements can be subordinated to presentation of notification-needed information. This is because, among matters to be presented to occupants, notification-needed information has higher priority than advertisements. This module controls each of the information presenting units 0201, for example, in such a manner that presentation of an advertisement is disabled while notification-needed information is being presented. This module further controls each of the information presenting units 0201 so that, when the notification-needed information acquiring unit 0202 acquires notification-needed information while an advertisement is being presented thereon, presentation of video-based advertisements can be stopped and text-only advertisements can be displayed in a corner of the display screen.

Figure 6:
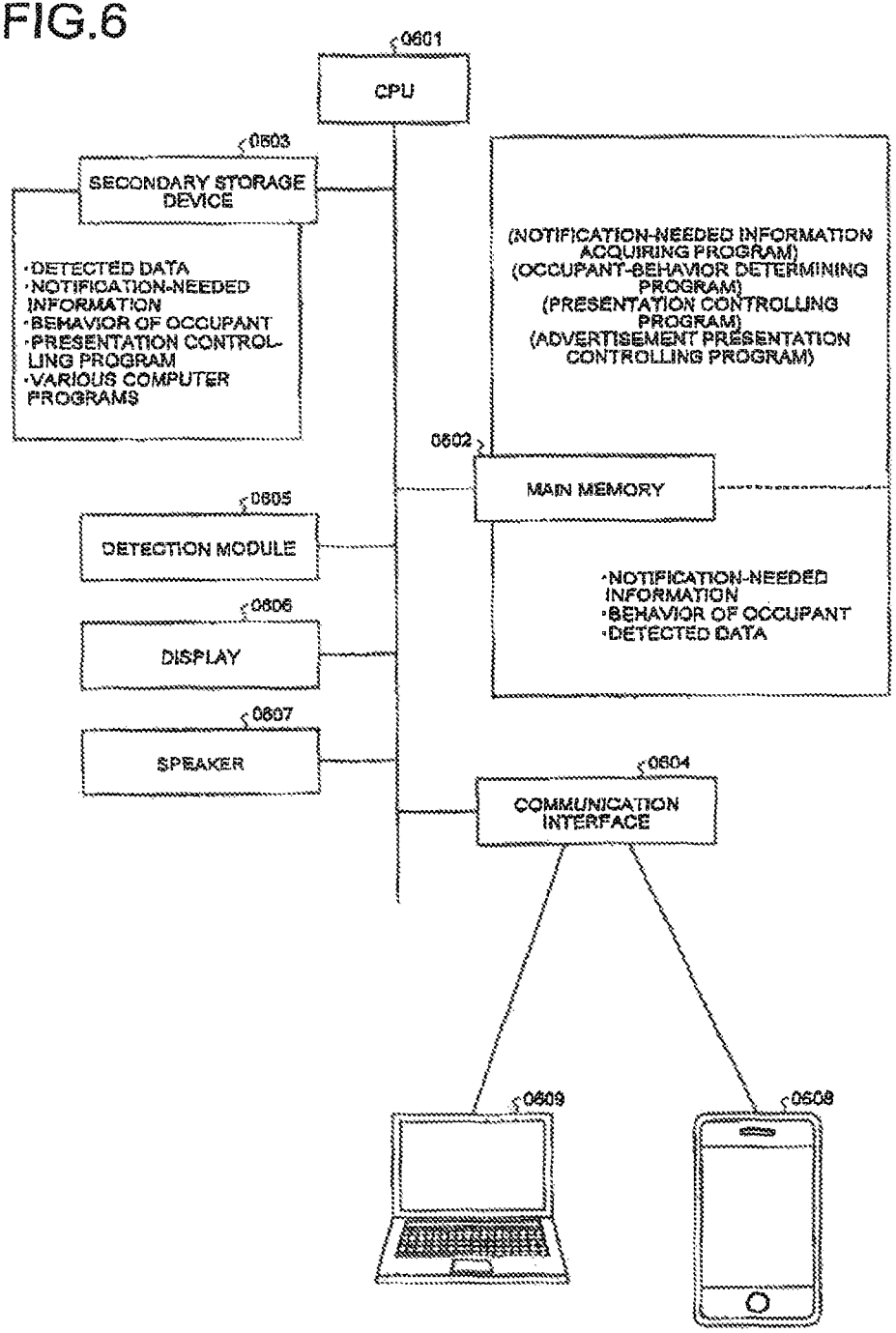
FIG. 6 is a schematic diagram representing an example of the hardware composition of the notification-needed information presenting apparatus in the first embodiment.

Hardware Composition FIG. 6 is a schematic diagram representing an example of the composition of the notification-needed information presenting apparatus obtained when the above functional components are implemented as hardware. The individual hardware components in the notification-needed information presenting apparatus are described based on this diagram.

As illustrated in this diagram, the notification-needed information presenting apparatus includes components such as a CPU 0601 for executing various kinds of arithmetic processing, a main memory 0602, a secondary storage device 0603, a communication interface 0604, various detection modules 0605, and a display 0606, and a speaker 0607. There are detected data and various computer programs stored in the secondary storage device, the various computer programs including a presentation controlling program. The CPU 0601 loads each of these various computer programs onto the main memory to execute the computer program. The above individual hardware components are connected to one another through a data communication path such as a system bus, thereby transmitting and receiving information to and from one another and processing information.

First, the CPU 0601 executes a notification-needed information acquiring program, reads out the stored detected data, and then acquires various kinds of information through the communication interface 0604, thereby acquiring notification-needed information. The CPU 0601 then executes an occupant-behavior determining program and reads out the stored detected data, thereby determining the behavior of each occupant. The detected data include detected data acquired from devices, such as a mobile terminal 0608 and a PC apparatus 0609, that are connected through the communication interface 0604.

The CPU 0601 then executes the presentation controlling program, thereby controlling presentation of the notification-needed information through the display 0606 unit and the speaker 0607. In addition, the CPU 0601 transmits the notification-needed information to the mobile terminal 0608 and the PC apparatus 0609 connected through the communication interface 0604 and controls presentation of the notification-needed information through these devices.

The CPU 0601 also executes the advertisement presentation controlling program, thereby controlling presentation of advertisements through the display 0606 and the speaker 0607 and presentation of advertisements through devices such as a mobile terminal. Optionally, the CPU 0601 controls the display 0606 and other information presenting units to subordinate presentation of advertisements to presentation of the notification-needed information.

Procedure of Processing

Figure 7:
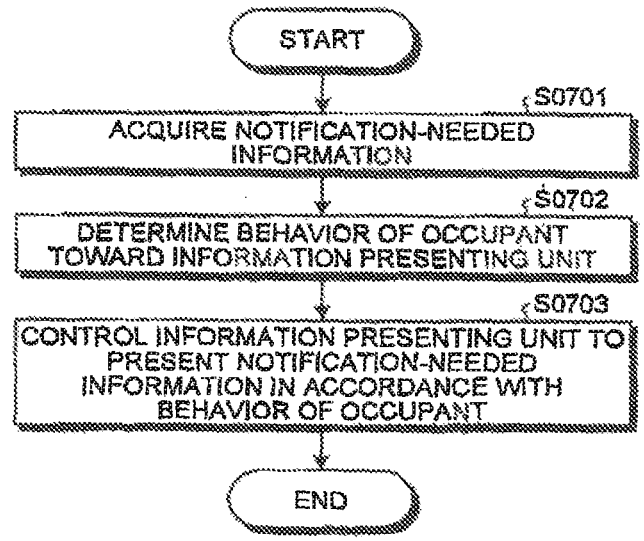
FIG. 7 is a flowchart illustrating an example of the procedure of processing that the notification-needed information presenting apparatus in the first embodiment performs.

FIG. 7 is a flowchart illustrating an example of the procedure of processing in the notification-needed information presenting apparatus in the first embodiment. The steps described below may be steps to be executed by individual hardware components of a computer such as the one described above (for example, the notification-needed information presenting apparatus) or may be processing steps forming a computer program for controlling a computer that are recorded in a medium.

As illustrated, at the start, notification-needed information, which is information that each occupant needs to be notified of through the information presenting unit in relation to operation of a vehicle, is acquired (Notification-needed Information Acquiring Step: S0701). Subsequently, the behavior of the occupant toward each information presenting unit is determined (Occupant-behavior Determining Step: S0702). Subsequently, the information presenting unit is controlled to present the notification-needed information to each occupant in accordance with the behavior of the occupant determined at Occupant-behavior Determining Step (Presentation Controlling Step: S0703).

Figure 8:
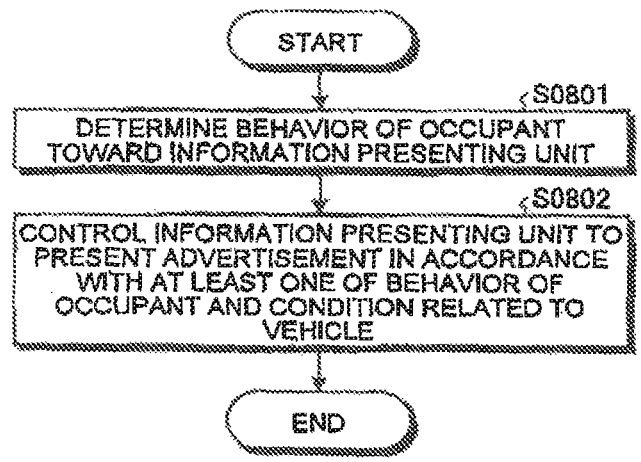
FIG. 8 is a flowchart representing one example of the procedure of processing for controlling presentation of an advertisement in the first embodiment.

FIG. 8 is a flowchart representing one example of the procedure of processing for controlling presentation of an advertisement in the first embodiment. As illustrated, at the start, the behavior of the occupant toward each information presenting unit is determined (Occupant-behavior Determining Step: S0801). Subsequently, the information presenting unit is controlled to present an advertisement in accordance with at least one of the behavior of each occupant determined at Occupant-behavior Determining Step and a condition related to a vehicle (Advertisement Presentation Controlling Step: S0802).

Effects

The notification-needed information presenting apparatus 0200 in the first embodiment enables an occupant to be notified of information that the occupant needs to be notified of.

Second Embodiment

Summary

A notification-needed information presenting apparatus in a second embodiment is based on the first embodiment, and is characterized in that an information presenting unit is controlled to present notification-needed information in accordance with the extent to which an occupant needs to be notified of the notification-needed information.

Configuration

Figure 9:
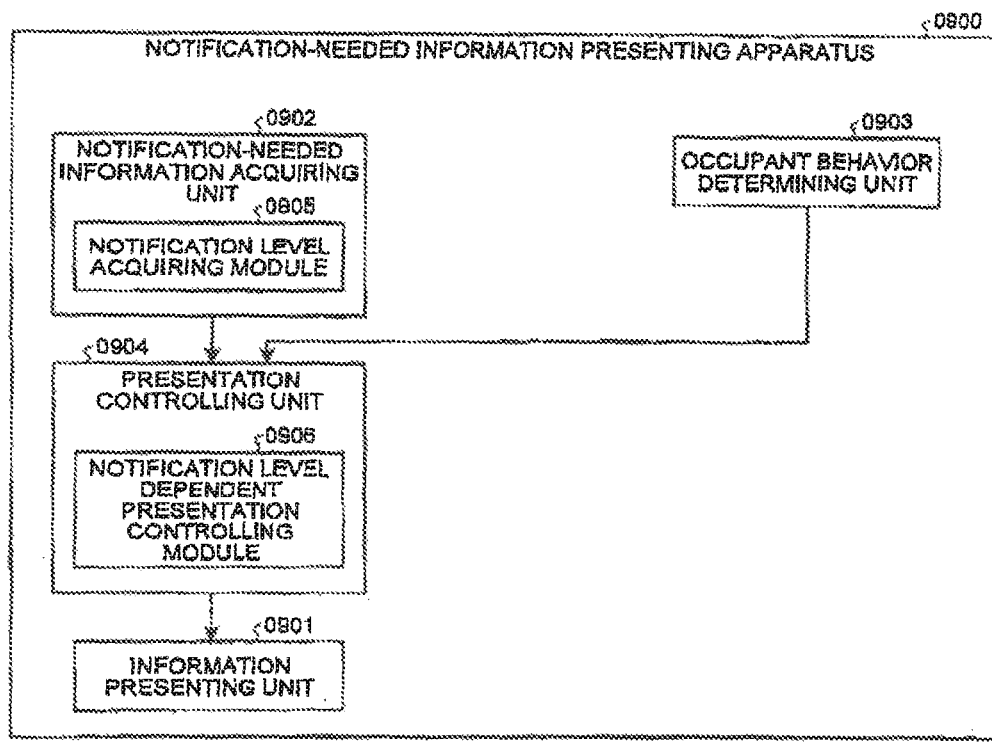
FIG. 9 is a block diagram illustrating an example of functional blocks of a notification-needed information presenting apparatus in a second embodiment.

FIG. 9 is a block diagram illustrating an example of functional blocks of the notification-needed information presenting apparatus in the second embodiment. As illustrated in FIG. 9, a notification-needed information presenting apparatus 0900 in the second embodiment includes an information presenting unit 0901, a notification-needed information acquiring unit 0902, an occupant behavior determining unit 0903, and a presentation controlling unit 0904; the notification-needed information acquiring unit 0902 includes a notification level acquiring module 0905; and the presentation controlling unit 0904 includes a notification level dependent presentation controlling module 0906. Illustration and description of an advertisement presentation controlling unit is omitted. The information presenting unit 0901 and the occupant behavior determining unit 0903 are the same as the corresponding units in the first embodiment and description thereof is therefore omitted.

The notification level acquiring module 0905 acquires a notification level of notification-needed information, which is the extent to which an occupant needs to be notified of the notification-needed information. FIG. 10 is a diagram illustrating an example of pieces of notification-needed information to which notification levels acquired by the notification level acquiring module are assigned. The notification levels are expressed as 10 levels, and Level 10 indicates that the extent to which notification about notification-needed information is needed is the highest. Acquisition of the notification levels is enabled by, for example, retaining a table in which contents of pieces of notification-needed information are associated with the notification levels thereof. The notification level dependent presentation controlling module 0906 controls the information presenting unit 0901 to present each piece of notification-needed information in accordance with the notification level thereof. Examples of a manner of presenting notification-needed information the notification level of which is high include: presenting the information after outputting an alerting loud warning tone; causing a display to flash so as to appeal to the sense of sight of an occupant; and vibrating a mobile terminal. The notification-needed information may be presented repeatedly so as to be presented for a long time period.

In contrast, notification-needed information the notification level of which is low may be presented, for example, in such a manner that text is displayed in a scrolled manner in a corner of a display that is displaying a video content, so as not to disturb the content viewing. The presentation may be controlled so that the outline of the notification-needed information can provisionally presented, and that no further information can be presented unless an operation for requesting presentation of detailed information is received from an occupant.

The notification-needed information presenting apparatus 0900 in the second embodiment can be implemented according to the hardware composition in the first embodiment. The procedure of processing therein is the same as the procedure of processing described in the first embodiment except that Notification-needed Information Acquiring Step includes processing for acquiring the notification level of each piece of notification-needed information, and that Presentation Controlling Step includes processing for controlling the presentation controlling unit 0904 in accordance with the acquired notification level.

Effects

Notification-needed information is presented in accordance with the notification level of the notification-needed information, which enables an occupant to be notified accurately of information that the occupant particularly needs to be notified of.

Third Embodiment

Summary

A notification-needed information presenting apparatus in a third embodiment is based on the first or the second embodiment, and is characterized in that notification-needed information is presented in accordance with the category of information that is being presented to an occupant by the information presenting unit.

Configuration

Figure 11:
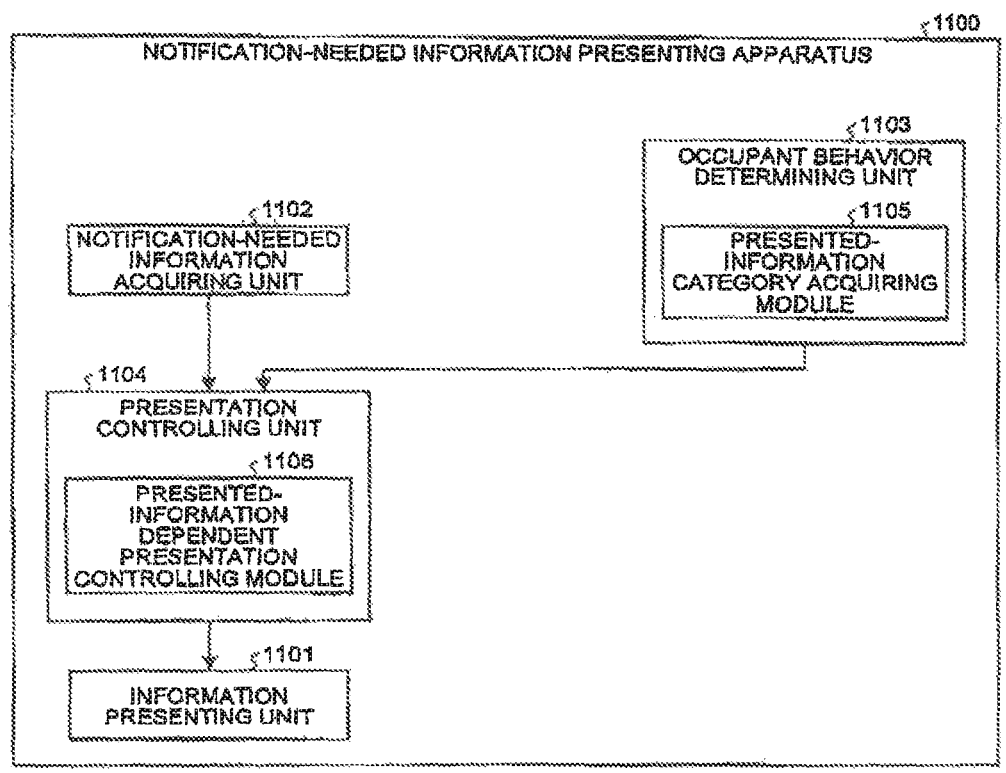
FIG. 11 is a block diagram illustrating an example of functional blocks of a notification-needed information presenting apparatus in a third embodiment.

FIG. 11 is a block diagram illustrating an example of functional blocks of the notification-needed information presenting apparatus in the third embodiment. As illustrated in FIG. 11, a notification-needed information presenting apparatus 1100 in the third embodiment includes an information presenting unit 1101, a notification-needed information acquiring unit 1102, an occupant behavior determining unit 1103, and a presentation controlling unit 1104; the occupant behavior determining unit 1103 includes a presented-information category acquiring module 1105; and the presentation controlling unit 1104 includes a presented-information dependent presentation controlling module 1106. Illustration and description of an advertisement presentation controlling unit is omitted. The information presenting unit 1101 and the notification-needed information acquiring unit 1102 are the same as the corresponding units in the first or second embodiment and description thereof is therefore omitted.

The presented-information category acquiring module 1105 acquires a presented-information category, namely, the category of presented information, which is information that the information presenting unit 1101 is presenting to an occupant. As examples of the presented-information category, various categories can be listed such as information for traveling of a vehicle, routing assistance, television broadcast, a video content recorded on a medium, the Internet use, a game, and execution of various applications. As the presented-information categories, more detailed categories may be acquired such as a program being broadcast, the content of a video content, and a category of a website or service (based on categorization into social networking services (SNS), searching, and news, for example) being used. The occupant behavior determining unit 1103 may acquire operational information (such as swiping, or inputting a query such as a character string), which is information on an operation being performed by an occupant on such presented-information, that is, information being browsed.

The presented-information dependent presentation controlling module 1106 controls the information presenting unit 1101 to present notification-needed information in accordance with at least one of the presented-information category and the operational information that have been acquired. For example, when the acquired presented-information category is a television broadcast program that is a tabloid show, the information presenting unit 1101 is controlled to present the notification-needed information instead of presenting the television broadcast. When the presented-information category is a website for trading financial products such as stocks on the Internet and is a screen immediately before ordering, the information presenting unit 1101 is controlled to present the notification-needed information in the form of text only on the corner of a display screen so as not to disturb the occupant in viewing the presented information, or to present notification information the notification level of which is a certain level or higher. Optionally, the information presenting unit 1101 may be controlled not to present notification-needed information, for example, during execution of an operation for trading or the like, during swiping, or during inputting of a query such as a character string, and present the notification-needed information after a certain time period starting from the end of such an operation.

Furthermore, when a plurality of pieces of notification-needed information are acquired, priorities in presenting these respective pieces of notification-needed information may be determined in accordance with the acquired presented-information category. For example, in a case where "a failure of a headlight" and "a traffic jam ahead in the route" are acquired as pieces of notification-needed information the acquired presented-information category is "routing assistance to a filling station", the control is performed so as to present "a traffic jam ahead in the route" in priority to the other.

The notification-needed information presenting apparatus 1100 in the third embodiment can be implemented according to the hardware composition in the first or second embodiment. The procedure of processing therein is the same as the procedure of processing described in the first or second embodiment except that Occupant-behavior Determining Step includes processing for acquiring a presented-information category, and that Presentation Controlling Step includes processing for controlling the presentation controlling unit 1104 in accordance with the acquired presented-information category.

Effects

The notification-needed information presenting apparatus 1100 in the third embodiment enables an occupant to be notified of notification-needed information that suits the category of presented information that is being presented.

Fourth Embodiment

Summary

A notification-needed information presenting apparatus in a fourth embodiment is based on any one of the first to third embodiments, and is characterized in that notification-needed information is presented while being highlighted against other information being presented, and that a graphic user interface (GUI) part for use in, for example, operating a vehicle is presented as notification-needed information.

Configuration

Figure 12:
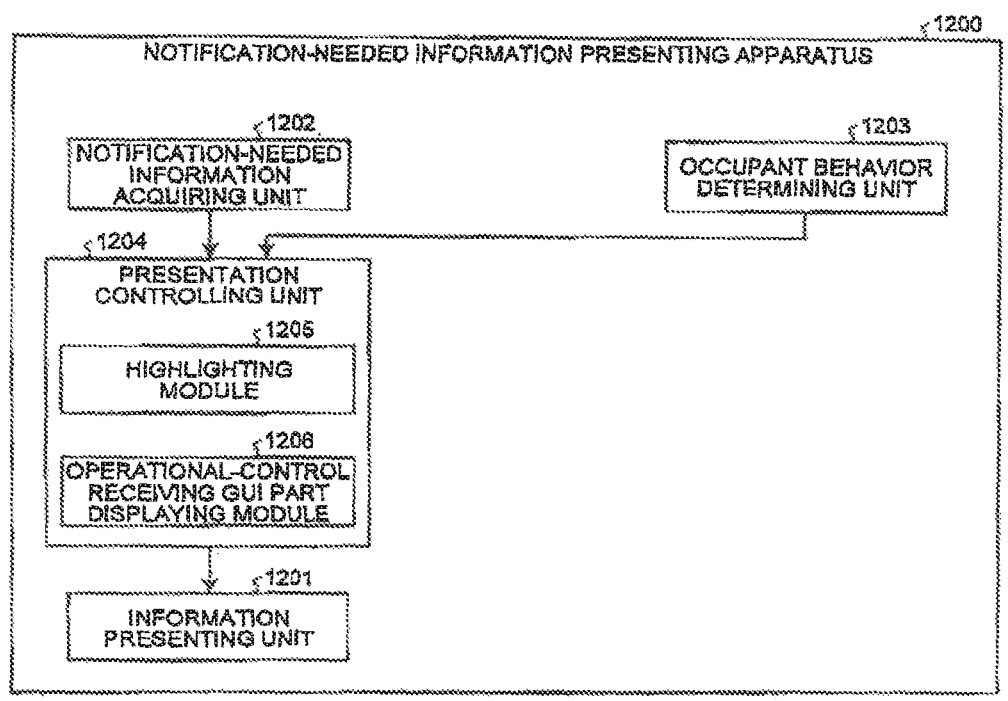
FIG. 12 is a block diagram illustrating an example of functional blocks of a notification-needed information presenting apparatus in a fourth embodiment.

FIG. 12 is a block diagram illustrating an example of functional blocks of the notification-needed information presenting apparatus in the fourth embodiment. As illustrated in FIG. 12, a notification-needed information presenting apparatus 1200 in the fourth embodiment includes an information presenting unit 1201, a notification-needed information acquiring unit 1202, an occupant behavior determining unit 1203, and a presentation controlling unit 1204; and the presentation controlling unit 1204 includes a highlighting module 1205 and an operational-control receiving GUI part displaying module 1206. Illustration and description of an advertisement presentation controlling unit is omitted. The information presenting unit 1201, the notification-needed information acquiring unit 1202, and the occupant behavior determining unit 1203 are the same as the corresponding units in any one of the first to third embodiments and description thereof is therefore omitted.

The highlighting module 1205 controls each of the information presenting units 1201 to highlight notification-needed information against other information being presented by the information presenting unit 1201. FIG. 13 is a conceptual diagram illustrating an example of highlighting notification-needed information against other information.

As illustrated, it is supposed that an image of a sunflower (hereinafter "sunflower image") is being presented as an element of some content on a mobile terminal that is the information presenting unit 1201. In this situation, when notification-needed information is acquired, the notification-needed information "Warning!Fuel is running out" is superimposed on the "sunflower image" while the sunflower image is made lighter. The notification-needed information is thus highlighted. The occupant can be notified accurately of the notification-needed information by presenting the notification-needed information thereto as is the case in this example.

The operational-control receiving GUI part displaying module 1206 controls the information presenting unit 1201 to display thereon, as a piece of notification-needed information, a GUI part for receiving operational control on a vehicle from an occupant. FIG. 14 is a conceptual diagram depicting an example of a GUI part for receiving operational control.

As illustrated, a GUI part "Search for filling stations" is displayed at the same time as a piece of notification-needed information "Warning! Fuel is running out" is displayed. When the occupant presses this GUI part, operations for searching for nearby filling stations and for routing assistance are received. Examples of a GUI part to be displayed include, in addition to the one given as an example above, GUI parts for receiving various kinds of operational control such as changing modes of automated driving and switching from automated driving to human-operated driving.

The notification-needed information presenting apparatus 1200 in the fourth embodiment can be implemented according to the hardware composition in any one of the first to third embodiments. The procedure of processing therein is the same as the procedure of processing described in any one of the first to third embodiments except that Presentation Controlling Step includes processing for controlling the information presenting unit 1201 to highlight notification-needed information against information being presented by the information presenting unit 1201, and processing for controlling the presentation controlling unit to display thereon, as a piece of notification-needed information, a GUI part for receiving operational control on a vehicle from an occupant.

Effects

The notification-needed information presenting apparatus 1200 in the fourth embodiment enables an occupant to be notified accurately of notification-needed information, and enables the occupant to easily perform an operation for responding to the notification-needed information.

As described above, a notification-needed information presenting apparatus according to the present application includes: at least one information presenting unit capable of presenting information to an occupant of a vehicle; a notification-needed information acquiring unit configured to acquire notification-needed information, which is information that the occupant needs to be notified of through the information presenting unit in relation to operation of the vehicle; an occupant behavior determining unit configured to determine the behavior of the occupant toward the information presenting unit; and a presentation controlling unit configured to control the information presenting unit to present the notification-needed information to the occupant in accordance with the behavior of the occupant determined by the occupant behavior determining unit.

While including the above composition, another notification-needed information presenting apparatus according to the present application includes a plurality of such information presenting units; the occupant behavior determining unit includes an information presenting unit specifying module configured to specify which one of the information presenting units used by the occupant; and the presentation controlling unit includes a specified-presentation controlling module configured to control the specified information presenting unit to present the notification-needed information.

Still another notification-needed information presenting apparatus is provided that includes any one of the above compositions, in which: the notification-needed information acquiring unit includes a notification level acquiring module configured to acquire a notification level, which is the extent to which an occupant needs to be notified of notification-needed information; and the presentation controlling unit includes a notification level dependent presentation controlling module configured to control the information presenting unit to present the notification-needed information in accordance with the notification level.

Still another notification-needed information presenting apparatus is provided that includes any one of the above compositions, in which: the occupant behavior determining unit includes a presented-information category acquiring module configured to acquire a presented-information category, namely, the category of presented information, which is information that the information presenting unit is presenting to an occupant; and the presentation controlling unit includes a presented-information dependent presentation controlling module configured to control the information presenting unit to present notification-needed information in accordance with the acquired presented-information category. Still another notification-needed information presenting apparatus is provided that includes any one of the above compositions, in which the presentation controlling unit includes: a highlighting module configured to control the information presenting unit to highlight notification-needed information against information being presented by the information presenting unit; and an operational-control receiving GUI part displaying module configured to control the presentation controlling unit to display thereon, as a piece of notification-needed information, a GUI part for receiving operational control on a vehicle from an occupant.

A notification-needed information presenting method to be carried out in a notification-needed information presenting apparatus including an information presenting unit capable of presenting information to an occupant of a vehicle is also provided that includes: acquiring notification-needed information, which is information that the occupant needs to be notified of through the information presenting unit in relation to operation of the vehicle; determining the behavior of the occupant toward the information presenting unit; and controlling the information presenting unit to present the notification-needed information to the occupant in accordance with the behavior of the occupant determined by the occupant behavior determining unit.

A computer program that causes a notification-needed information presenting apparatus to operate is also provided, the notification-needed information presenting apparatus including an information presenting unit capable of presenting information to an occupant of a vehicle. The computer program causes the notification-needed information presenting apparatus to execute: acquiring notification-needed information, which is information that the occupant needs to be notified of through the information presenting unit in relation to operation of the vehicle; determining the behavior of the occupant toward the information presenting unit; and controlling the information presenting unit to present the notification-needed information to the occupant in accordance with the behavior of the occupant determined by the occupant behavior determining unit.

Effects

According to the present invention, occupants taking on various forms of behavior are enabled to be notified of information that the occupants need to be notified of.

Fifth Embodiment

Summary

A notification-needed information presenting apparatus according to the present application may be configured as in a fifth embodiment described below.

Figure 15:
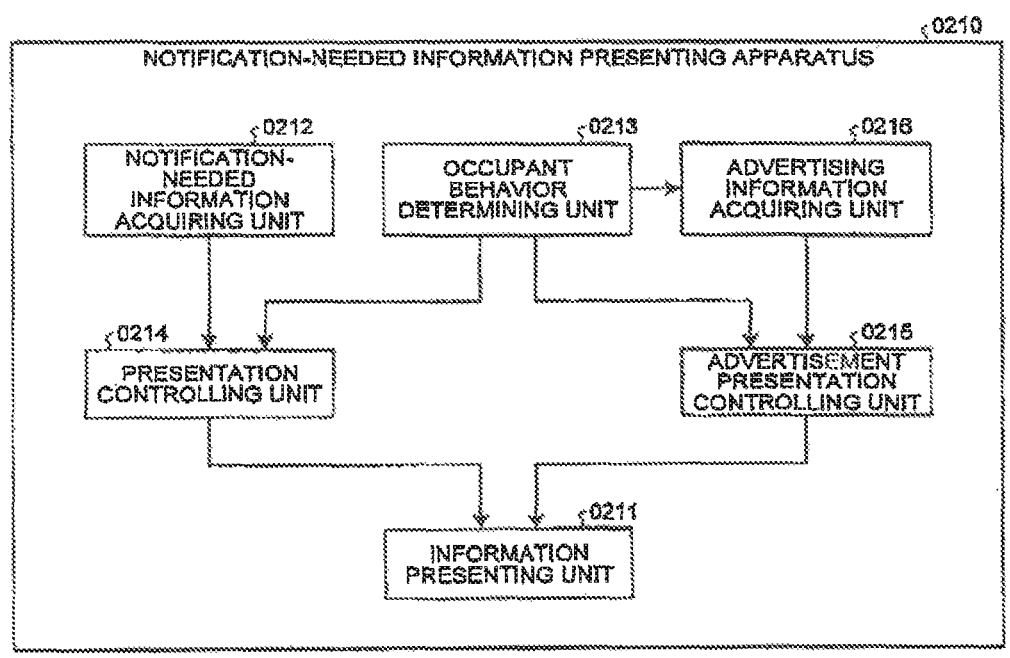
FIG. 15 is a block diagram illustrating an example of functional blocks of a notification-needed information presenting apparatus in a fifth embodiment.

As illustrated in FIG. 15, a notification-needed information presenting apparatus 0210 in the fifth embodiment includes an information presenting unit 0211, a notification-needed information acquiring unit 0212, an occupant behavior determining unit 0213, a presentation controlling unit 0214, an advertisement presentation controlling unit 0215, and an advertising information acquiring unit 0216. The notification-needed information acquiring unit 0212, the presentation controlling unit 0214, and the advertising information acquiring unit 0216 are not essential components that the notification-needed information presenting apparatus in the fifth embodiment needs to include. Description of a part of the same processing as that of any of other embodiments is omitted.

The advertisement presentation controlling unit 0215 controls the information presenting unit 0211 to present an advertisement in accordance with at least one of the behavior of an occupant determined by the occupant behavior determining unit 0213 and a condition related to the vehicle. It is considered that presentation of an advertisement to an occupant more effectively works if being performed in accordance with the behavior of the occupant, the state of traveling of a vehicle, the surrounding environment, and so on. The controlling through controlling advertisement presentation includes presenting no advertisement. Advertisements herein are those that promote products or services mainly in the pursuit of revenues and that clearly indicate the advertisers thereof.

The behavior of an occupant is as described in connection with the occupant behavior determining unit 0213. A wide variety of conditions, such as conditions related to the vehicle itself, conditions of the surroundings and the environment around the vehicle, and types of information being displayed by the information presenting units 0211 inside the vehicle, correspond to the "condition related to the vehicle". For example, various conditions such as the following correspond thereto: the vehicle inspection expiration date; the vehicle shape; the remaining fuel quantity; the level of automated driving; the weather; the climate; the traveling speed; the operational status of an air conditioner; the open/closed statuses of windows, a sun roof, and the like; the number of occupants; the current location; whether the vehicle is on an ordinary road or on an express highway; traffic volumes in the surrounding areas; the distance and the difference in speed between the vehicle and each nearby vehicle; whether there is a vehicle parked on a side of the road; the statuses of automated driving of nearby vehicles (such as whether there are vehicles traveling in a platoon, and the number of vehicles forming the platoon); whether there is an accompanying vehicle and the positional relation therewith; the destination; and the traveling history.

Some of these various conditions have been retained in an information processing apparatus and an navigation device that are included in the vehicle; some are acquired by various sensors included in the vehicle; some are input through operations performed by an occupant; some are acquired through broadcasting or the Internet; and some are acquired from GPS. Handling such as acquisition and retention of these conditions is thus possible. The notification-needed information presenting apparatus in the fifth embodiment may include a vehicle condition acquiring unit as a component for acquiring the condition related to the vehicle. In addition thereto, the advertisement presentation controlling unit 0215 may include a vehicle condition dependent advertising presentation controlling module configured to control the information presenting unit 0211 to present an advertisement in accordance with a vehicle condition acquired by the vehicle condition acquiring unit.

In one aspect in the case where this notification-needed information presenting apparatus includes the vehicle condition acquiring unit while the advertisement presentation controlling unit 0215 includes a vehicle condition dependent advertisement presentation controlling module, information that the vehicle has just crossed a border between prefectures is acquired as the vehicle condition, for example. In response, the information presenting unit 0211 is controlled to present an advertisement of a local special product of the prefecture newly entered by the vehicle. In another example of the controlling, when information that the vehicle is traveling on a narrow road or a road crowded with pedestrians is acquired as the vehicle condition, the information presenting unit 0211 are controlled not to present any advertisement. In addition, while the vehicle is traveling through a traffic jam, the information presenting unit 0211 is controlled to present advertisements so long as ADAS is effectively functioning.

Aspects of the controlling by the advertisement presentation controlling unit 0215 include an aspect in a case where, while the occupant behavior determining unit 0213 includes a presented-information category acquiring module, the advertisement presentation controlling unit 0215 includes a presented-information dependent advertisement presentation controlling module. The presented-information category acquiring module acquires a presented-information category, namely, the category of presented information, which is information that the information presenting unit 0211 is presenting to an occupant. As examples of the presented-information category, various categories can be listed such as information for traveling of a vehicle, routing assistance, television broadcast, a video content recorded on a medium, the Internet use, a game, and execution of various applications. As the presented-information categories, more detailed categories may be acquired such as a program being broadcast, the content of a video content, and a website being used.

The presented-information dependent advertisement presentation controlling module controls the information presenting unit 0211 to present an advertisement in accordance with the acquired presented-information category. For example, a display for driving is controlled to present an advertisement of an automobile supply house to an occupant viewing accumulated data on the fuel economy being displayed on the display for driving. A navigation device is controlled to present an advertisement of a restaurant to an occupant searching for nearby restaurants on the navigation device. A tablet terminal is controlled to present an advertisement of a travel to an occupant browsing information on a tourist spot on the tablet terminal. Presenting advertisements on a mobile terminal and a tablet terminal may include transmitting an advertising tool such as a coupon or an access map to those terminals. Optionally, when the vehicle is equipped with a printer, the presenting may include an instruction to print out a coupon or an access map.

Furthermore, the advertisement presentation controlling unit 0215 may control each of the information presenting units 0211 to present an advertisement in a manner that suits the behavior of an occupant and/or a condition related to the vehicle. For example, the display for driving is controlled to present advertisements only by way of audio output to an occupant facing the display for driving. While the vehicle is traveling through a traffic jam and is on autopilot, the display for driving is controlled to present video advertisements containing sound for a relatively long period of time. While the vehicle is traveling on a winding mountainous road, the display for driving is controlled to present simple advertisements such as a combination of a still image and audio output of a trade name.

The advertisement presentation controlling unit 0215 may specify, in accordance with the content of an advertisement, one of the information presenting units 0211 on which to present the advertisement, and controls the specified information presenting unit 0211 to present the advertisement. For example, when an advertisement of an automobile supply house or of a filling station is presented, only the information presenting unit 0211 that presents information for driving is controlled to present the advertisement. When an advertisement of a nearby tourist facility is presented, each of the information presenting units 0211 is controlled so that all of the information presenting units 0211 being used by occupants inside the vehicle can present the advertisement.

Furthermore, the advertisement presentation controlling unit 0215 may include an advertisement subordination controlling module configured to control the information presenting units 0211 so that presentation of advertisements can be subordinated to presentation of notification-needed information. This is because, among matters to be presented to occupants, notification-needed information has higher priority than advertisements. This module controls each of the information presenting units 0211, for example, in such a manner that presentation of an advertisement is disabled while notification-needed information is being presented. This module may control each of the information presenting units 0211 to present an advertisement after the elapse of a certain period of time since presentation of notification-needed information or after any occupant performs an operation for responding to the information that the occupant has been notified of. This module may further control each of the information presenting units 0211 so that, when the notification-needed information acquiring unit 0212 receives notification-needed information while an advertisement is being presented, presentation of any video-based advertisements can be stopped and text-only advertisements can be displayed in a corner of the display screen.

The notification-needed information presenting apparatus 0210 in the fifth embodiment may further include a notification-needed information category acquiring module that acquires a notification-needed information category, which is the category of notification-needed information acquired by the notification-needed information acquiring unit 0212; and the advertisement presentation controlling unit 0215 may include a notification-needed information category dependent advertisement presenting module configured to control the information presenting unit 0211 to present an advertisement in accordance with the acquired notification-needed information category.

The notification-needed information categories may be rough categories illustrated in FIG. 3 such as the surrounding environment and the vehicle, or may be detailed categories such as the weather, traffic jams, accidents, the geography of the surrounding areas, failures, equipment of the vehicle, and so on. The notification-needed information categories can be acquired in the following manner. Some of the notification-needed information categories that are assigned to notification-needed information acquired by the notification-needed information acquiring unit 0212 are acquired as the notification-needed information categories. The other notification-needed information categories that are not assigned thereto may be acquired in such a manner that: a table in which contents of information indicated by notification-needed information are associated with corresponding categories is retained; and the notification-needed information acquiring unit 0212 acquires the notification-needed information categories with reference to the table.

Exemplary manners in which advertisements are presented under the control of the notification-needed information category dependent presentation controlling module are such that, when notification-needed information that falls into the category of accidents, an advertisement of automobile insurance is presented and such that, when notification-needed information that falls into the category of the geography of the surrounding areas, an advertisement of a shop selling local special products.

The timing of presentation of an advertisement may be controlled so as to suit the notification-needed information category thereof. For example, when notification-needed information that falls into such a category as accidents or failures is presented, presentation of an advertisement is controlled so that the advertisement can be presented after a little time passes from the time of presentation of the notification-needed information, without being presented immediately after the presentation. This is because, immediately after notification-needed information such as the occurrence of an accident or a failure is presented, an occupant may be too busy in responding to such an emergency to pay attention to advertisements.

The advertising information acquiring unit 0216 acquires advertising information, which is information for presenting advertisements, in accordance with any one or more of: the behavior of a corresponding occupant that has been determined; the condition related to the vehicle; the presented-information category; notification-needed information; attribute information on users including the occupant; vehicle state information indicating the state of the vehicle; vehicle accessory equipment state information indicating the states of accessory equipment of the vehicle; travel history information indicating the travel history of the vehicle; and travel schedule information indicating the travel schedule of the vehicle. The attribute information on users including the occupant, the vehicle state information indicating the state of the vehicle, the vehicle accessory equipment state information indicating the states of accessory equipment of the vehicle, the travel history information indicating the travel history of the vehicle, and the travel schedule information indicating the travel schedule of the vehicle are described in a sixth embodiment, as described in further detail below.

In the notification-needed information presenting apparatus 0210 in the fifth embodiment, as described above, presentation of advertisements is controlled in accordance with various conditions such as the behavior of a corresponding occupant and a condition related to the vehicle. An advertisement that suits various conditions such as the behavior of the occupant and the condition related to the vehicle is presented. Correspondingly, the advertising information for presenting advertisements in accordance with any one or more of the above-described various conditions is acquired. The advertising information can be acquired through a communication line, public broadcast, or the like.

Effects

The notification-needed information presenting apparatus 0210 in the fifth embodiment presents advertisements in accordance with various conditions inside and outside a vehicle and the behavior of an occupant.

Appeals of advertisements to the occupant can be thus enhanced.

Sixth Embodiment

Summary

A notification-needed information presenting apparatus according to the present application may be configured as in a sixth embodiment described below.

Configuration

Figure 16:
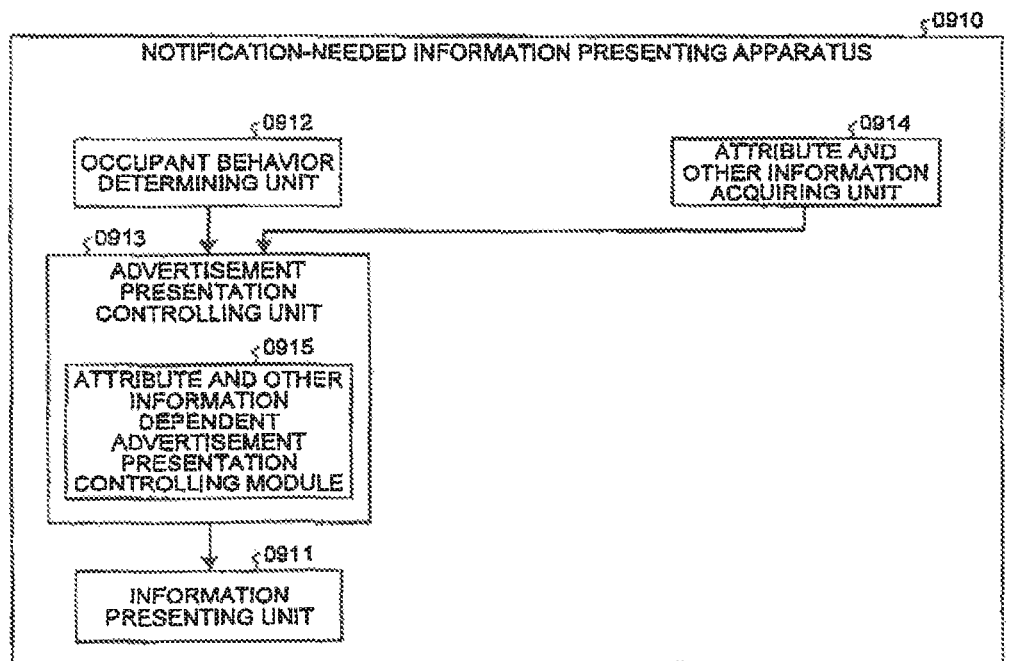
FIG. 16 is a block diagram illustrating an example of functional blocks of a notification-needed information presenting apparatus in a sixth embodiment.

FIG. 16 is a block diagram illustrating an example of functional blocks of a notification-needed information presenting apparatus in the sixth embodiment. As illustrated in FIG. 16, a notification-needed information presenting apparatus 0910 in the sixth embodiment includes an information presenting unit 0911, an occupant behavior determining unit 0912, an advertisement presentation controlling unit 0913, and an attribute and other information acquiring unit 0914; and the advertisement presentation controlling unit 0913 includes an attribute and other information dependent advertisement presentation controlling module 0915. Illustration and description of a notification-needed information acquiring unit, a presentation controlling unit, and an advertising information acquiring unit is omitted. The information presenting unit 0911 and the occupant behavior determining unit 0912 are the same as the corresponding units in the fifth embodiment and description thereof is therefore omitted.

The attribute and other information acquiring unit 0914 acquires attribute and other information, which is information that is any one or more of: attribute information on users including a corresponding occupant; the vehicle state information indicating the state of a vehicle; the vehicle accessory equipment state information indicating the states of accessory equipment of the vehicle; the travel history information indicating the travel history of the vehicle; and the travel schedule information indicating the travel schedule of the vehicle.

The term "users" means all persons that are likely to use this notification-needed information presenting apparatus regardless of whether or not each is currently riding on the vehicle. The attribute information on users including an occupant is, for example, various kinds of information on users such as genders, ages, occupations, hobbies, and member registration numbers of some memberships if applicable. The attribute information on the users is acquired through input operations or the like performed by the respective users.

The vehicle state information and the vehicle accessory equipment state information are acquired through detection modules installed in the vehicle or in the accessory equipment, or are acquired by being input by the users. The travel history information and the travel schedule information are acquired from a navigation device installed in a vehicle, or are acquired by being input by the users. The attribute and other information may be: vehicle inspection information such as the vehicle inspection expiration date and contents of inspection and maintenance; insurance information such as the expiration date and the contractual coverage of a voluntary insurance; or other information directly or indirectly related to operation of the vehicle.

The attribute and other information dependent advertisement presentation controlling module 0915 controls the information presenting unit 0911 to present an advertisement in accordance with the acquired attribute and other information. For example, when the users include a child, the information presenting unit 0911 is controlled to present an advertisement of an amusement park or the like. The attribute and other information dependent advertisement presentation controlling module 0915 also controls, in accordance with the attribute and other information, which screen of the screens of the information presenting units 0911 an advertisement is displayed on, and what manner of expression (such as an expression form of images or characters) is employed in the presentation. The information presenting unit 0911 is further controlled to present advertisements related to hobbies of the users. Furthermore, when the users include an aged person, the information presenting unit 0911 is controlled to present an advertisement with a higher output sound volume and enlarged text.

When the users have memberships that allow the user to receive various services such as a point service and a mileage service, the information presenting unit 0911 is further controlled to present advertisements of facilities or the like at which the services can be received. Optionally, the information presenting unit 0911 may be controlled to present advertisements of various service providers with which the users do not have a membership.

Furthermore, the information presenting unit 0911 is controlled to present an advertisement of an automobile dealer or an automotive maintenance shop in accordance with the first year registration date of the vehicle acquired as the vehicle state information, and is controlled, when December has come, to present an advertisement of a tire shop in accordance with the vehicle accessory equipment state information indicating that the vehicle is wearing summer tires. The information presenting unit 0911 is also controlled to present advertisements of a supermarket and an outdoor equipment store that are located near the route to the destination, in accordance with the travel schedule information indicating that the destination is a camping site.

Effects

Presentation of advertisements in accordance with the attribute and other information makes it possible to perform advertising that is more highly relevant to the users and the vehicle in a timely manner.

As described above, a notification-needed information presenting apparatus according to the present application includes: at least one information presenting unit capable of presenting information to an occupant of a vehicle; an occupant behavior determining unit configured to determine the behavior of the occupant toward the information presenting unit; and an advertisement presentation controlling unit configured to control the information presenting unit to present an advertisement in accordance with at least one of the behavior of the occupant determined by the occupant behavior determining unit and a condition related to the vehicle.

Another notification-needed information presenting apparatus is provided that includes the above composition, and further include a notification-needed information acquiring unit configured to acquire notification-needed information, which is information that the occupant needs to be notified of through the information presenting unit in relation to operation of the vehicle. In this notification-needed information presenting apparatus, the advertisement presentation controlling unit includes an advertisement subordination controlling module configured to control the information presenting unit so that presentation of advertisements can be subordinated to presentation of notification-needed information. Still another notification-needed information presenting apparatus is provided that includes the above composition, and further includes a notification-needed information category acquiring unit configured to acquire a notification-needed information category, which is the category of notification-needed information acquired by the notification-needed information acquiring unit. In this notification-needed information presenting apparatus, the advertisement presentation controlling unit includes a notification-needed information category dependent advertisement presentation controlling module configured to control the information presenting unit to present an advertisement in accordance with the acquired notification-needed information category.

Still another notification-needed information presenting apparatus is provided that includes any one of the above compositions, in which: the occupant behavior determining unit includes a presented-information category acquiring module configured to acquire a presented-information category, namely, the category of presented information, which is information that the information presenting unit is presenting to an occupant; and the advertisement presentation controlling unit includes a presented-information dependent advertisement presentation controlling module configured to control the information presenting unit to present an advertisement in accordance with the acquired presented-information category.

Still another notification-needed information presenting apparatus is provided that includes any one of the above compositions, and further includes an attribute and other information acquiring unit configured to acquire attribute and other information, which is information that is any one or more of: attribute information on users including a corresponding occupant; the vehicle state information indicating the state of a vehicle; the vehicle accessory equipment state information indicating the states of accessory equipment of the vehicle; the travel history information indicating the travel history of the vehicle; and the travel schedule information indicating the travel schedule of the vehicle. In this notification-needed information presenting apparatus, the advertisement presentation controlling unit includes a attribute and other information dependent advertisement presentation controlling module configured to control the information presenting unit to present an advertisement in accordance with the attribute and other information acquired.

Still another notification-needed information presenting apparatus is provided that includes any one of the above compositions, and further includes a vehicle condition acquiring unit configured to acquire a vehicle condition, which is the condition related to a vehicle. In this notification-needed information presenting apparatus, the advertisement presentation controlling unit includes a vehicle condition dependent advertisement presentation controlling module configured to control the information presenting unit to present an advertisement in accordance with the acquired vehicle condition.

An information processing method to be carried out in a notification-needed information presenting apparatus including an information presenting unit capable of presenting information to an occupant of a vehicle is also provided that includes: determining the behavior of the occupant toward the information presenting unit; and controlling the information presenting unit to present an advertisement in accordance with at least one of the behavior of the occupant determined at the determining behavior of the occupant and a condition related to vehicle.

A computer program configured to cause a notification-needed information presenting apparatus to operate, the notification-needed information presenting apparatus including an information presenting unit capable of presenting information to an occupant of a vehicle, is also provided that causes the notification-needed information presenting apparatus to execute: determining the behavior of the occupant toward the information presenting unit; and controlling the information presenting unit to present an advertisement in accordance with at least one of the behavior of the occupant determined at the determining behavior of the occupant and a condition related to the vehicle.

According to the present invention, advertisements can be presented in manners suiting various situations that occupants are in and the behavior of the occupants.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A notification-needed information presenting apparatus comprising:

a plurality of display devices configured to display information to an occupant of a vehicle, the plurality of display devices including: (i) installed devices on the vehicle, and (ii) at least one non-installed device on the vehicle, which are removable from the vehicle, the at least one non-installed device detecting a behavior of the occupant based on an operation state of the non-installed device;

at least one sensor included in each of the installed devices of the plurality of display devices, each sensor being configured to detect at least one of: a position of the occupant, and the behavior of the occupant; and a processor operatively coupled with the plurality of display devices and each of the at least one sensor, the processor being programmed to:

acquire notification-needed information, which is information that the occupant needs to be notified of through the plurality of display devices in relation to operation of the vehicle;

determine behavior of the occupant toward the plurality of display devices based on the position of the occupant and the behavior of the occupant detected by the installed devices and the behavior of the occupant detected by the at least one non-installed device;

determine a notification level of a plurality of notification levels of the notification-needed information to be displayed on the plurality of display devices, the plurality of notification levels indicating a degree to which the occupant needs to be notified of the notification-needed information; and control the plurality of display devices to display an advertisement to the occupant in a subordinated manner as compared to the notification-needed information in accordance with (i) at least one of: the determined behavior of the occupant, and a condition related to the vehicle, and (ii) the determined notification level of the plurality of notification levels.

2. The notification-needed information presenting apparatus according to claim 1, wherein the processor is programmed to:

acquire a presented-information category, which is a category of presented information, which is information that the plurality of display devices present to the occupant; and control the plurality of display devices to present the advertisement in accordance with the acquired presented-information category.

3. The notification-needed information presenting apparatus according to claim 1, wherein the processor is programmed to:

acquire attribute and vehicle-related information, which is information including any one or more pieces of: attribute information on users including the occupant, vehicle state information indicating a state of the vehicle, vehicle accessory equipment state information indicating states of accessory equipment of the vehicle, travel history information indicating travel history of the vehicle, and travel schedule Information indicating a travel schedule of the vehicle; and control the plurality of display devices to present the advertisement in accordance with the acquired attribute and vehicle-related information.

4. The notification-needed information presenting apparatus according to claim 1, wherein the processor is programmed to:

acquire a vehicle condition, which is a condition related to the vehicle; and control the plurality of display devices to present the advertisement in accordance with the acquired vehicle condition.

5. The notification-needed information presenting apparatus according to claim 1, wherein the processor is programmed to:

acquire a notification-needed information category, which is a category of the acquired notification-needed information; and control the plurality of display devices to present the advertisement in accordance with the acquired notification-needed information category.

6. The notification-needed information presenting apparatus according to claim 1, wherein the processor is programmed to:

specify one of the plurality of display devices used by the occupant; and control the specified one of the plurality of display devices to present the notification-needed information.

7. The notification-needed information presenting apparatus according to claim 1, wherein the processor is programmed to:

acquire a presented-information category, which is a category of presented information, which is information that the plurality of display devices present to the occupant; and control the plurality of display devices to present the notification-needed information in accordance with the acquired presented-information category.

8. The notification-needed information presenting apparatus according to claim 1, wherein the processor is programmed to:

highlight the notification-needed information as compared to other information presented by the plurality of display devices; and control the plurality of display devices to present, as a piece of the notification-needed information, an operational-control receiving graphic user interface (GUI) that receives operational control on the vehicle from the occupant.

9. A notification-needed information presenting method to be carried out in a notification-needed information presenting apparatus including (i) a plurality of display devices configured to display information to an occupant of a vehicle, the plurality of display devices including installed devices on the vehicle, and at least one non-installed device on the vehicle, which are removable from the vehicle, the at least one non-installed device detecting a behavior of the occupant based on an operation state of the non-installed device, and (ii) at least one sensor included in each of the installed devices of the plurality of display devices, each sensor being configured to detect at least one of: a position of the occupant, and the behavior of the occupant, the notification-needed information presenting method comprising:

acquiring notification-needed information, which is information that the occupant needs to be notified of through the plurality of display devices in relation to operation of the vehicle;

determining a behavior of the occupant towards the plurality of display devices based on the position of the occupant and the behavior of the occupant detected by the installed devices and the behavior of the occupant detected by the at least one non-installed device;

determining a notification level of a plurality of notification levels of the notification-needed information to be displayed on the plurality of display devices, the plurality of notification levels indicating a degree to which the occupant needs to be notified of the notification-needed information; and controlling the plurality of display devices to display an advertisement to the occupant in a subordinated manner as compared to the notification-needed information in accordance with (i) at least one of: the determined behavior of the occupant, and a condition related to the vehicle, and (ii) the determined notification level of the plurality of notification levels.

10. A non-transitory computer readable storage medium having stored therein a notification-needed information presenting program that causes a notification-needed information presenting apparatus to operate, the notification-needed information presenting apparatus including: (i) a plurality of display devices configured to display information to an occupant of a vehicle, the plurality of display devices including installed devices on the vehicle, and at least one non-installed device on the vehicle, which are removable from the vehicle, the at least one non-installed device detecting a behavior of the occupant based on an operation state of the non-installed device, and (ii) at least one sensor included in each of the installed devices of the plurality of display devices, each sensor being configured to detect at least one of: a position of the occupant, and the behavior of the occupant, the notification-needed information presenting program causing the notification-needed information presenting apparatus to execute:

acquiring notification-needed information, which is information that the occupant needs to be notified of through the plurality of display devices in relation to operation of the vehicle;

determining behavior of the occupant towards the plurality of display devices based on the position of the occupant and the behavior of the occupant detected by the installed devices and the behavior of the occupant detected by the at least one non-installed device;

determining a notification level of a plurality of notification levels of the notification-needed information to be displayed on the plurality of display devices, the plurality of notification levels indicating a degree to which the occupant needs to be notified of the notification-needed information; and controlling the plurality of display devices to display an advertisement to the occupant in a subordinated manner as compared to the notification-needed information in accordance with (i) at least one of: the determined behavior of the occupant, and a condition related to the vehicle, and (ii) the determined notification level of the plurality of notification levels.

* * * * *